United States Patent
Ginggen et al.

(10) Patent No.: US 9,201,484 B2
(45) Date of Patent: *Dec. 1, 2015

(54) CIRCUITRY FOR OPTIMIZATION OF POWER CONSUMPTION IN A SYSTEM EMPLOYLING MULTIPLE ELECTRONIC COMPONENTS, ONE OF WHICH IS ALWAYS POWERED ON

(75) Inventors: Alec Ginggen, Neuchâtel (CH); Rocco Crivelli, Bellinzona (CH)

(73) Assignee: Codman Neuro Sciences Sárl, LeLocle (CH)

(*) Notice: Subject to any disclaimer, the term of this patent is extended or adjusted under 35 U.S.C. 154(b) by 1391 days.

This patent is subject to a terminal disclaimer.

(21) Appl. No.: 12/313,445

(22) Filed: Nov. 19, 2008

(65) Prior Publication Data

US 2009/0138739 A1 May 28, 2009

Related U.S. Application Data

(63) Continuation of application No. 11/140,053, filed on May 27, 2005, now Pat. No. 7,472,301.

(51) Int. Cl.
*G06F 1/00* (2006.01)
*G06F 1/32* (2006.01)

(52) U.S. Cl.
CPC ............ *G06F 1/3203* (2013.01); *G06F 1/3293* (2013.01); *Y02B 60/121* (2013.01); *Y02B 60/1217* (2013.01); *Y02B 60/32* (2013.01)

(58) Field of Classification Search
USPC .......................................... 713/324; 348/734
See application file for complete search history.

(56) References Cited

U.S. PATENT DOCUMENTS

| | | | | |
|---|---|---|---|---|
| 4,034,232 A * | 7/1977 | LaVenture | ...................... | 307/32 |
| 4,194,147 A * | 3/1980 | Payne et al. | ................... | 323/284 |
| 4,407,288 A | 10/1983 | Langer et al. | | |
| 5,022,395 A | 6/1991 | Russie | | |
| 5,142,684 A | 8/1992 | Perry et al. | | |
| 5,167,024 A * | 11/1992 | Smith et al. | ................... | 713/322 |
| 5,396,635 A * | 3/1995 | Fung | ............................. | 713/323 |
| 5,464,435 A | 11/1995 | Neumann | | |
| 5,560,024 A * | 9/1996 | Harper et al. | ................. | 713/322 |
| 5,623,677 A | 4/1997 | Townsley et al. | | |
| 5,708,819 A * | 1/1998 | Dunnihoo | ...................... | 713/323 |
| 5,996,083 A * | 11/1999 | Gupta et al. | .................. | 713/322 |
| 6,023,641 A | 2/2000 | Thompson | | |
| 6,167,303 A | 12/2000 | Thompson | | |
| 6,185,460 B1 | 2/2001 | Thompson | | |
| 6,233,080 B1 | 5/2001 | Brenner et al. | | |
| 6,236,888 B1 | 5/2001 | Thompson | | |
| 6,240,521 B1 * | 5/2001 | Barber et al. | ................. | 713/323 |

(Continued)

*Primary Examiner* — Paul R Myers
(74) *Attorney, Agent, or Firm* — Cohen & Hildebrand, PLLC

(57) ABSTRACT

Circuitry for conserving power in a system employing multiple electronic components of which a first electronic component operates at a first frequency and is continuously powered on by a power source. The system further includes a second electronic component operating at a second frequency different than that of the first frequency of the first electric component, the second electronic component being maintained in a powered off state in which no energy whatsoever is consumed by the second electronic component until energized in response to a power enabling signal generated by the first electronic component based on demand of the particular function to be performed by the second electronic component. The first and second electronic components may be processors, wherein the frequency of the first processor is lower than that of the second processor.

11 Claims, 2 Drawing Sheets

(56) References Cited

U.S. PATENT DOCUMENTS

| | | |
|---|---|---|
| 6,288,881 B1 * | 9/2001 | Melvin et al. .................. 361/18 |
| 6,324,426 B1 | 11/2001 | Thompson |
| 6,571,128 B2 | 5/2003 | Lebel et al. |
| 6,631,474 B1 * | 10/2003 | Cai et al. ...................... 713/300 |
| 6,718,475 B2 * | 4/2004 | Cai ............................... 713/323 |
| 6,836,850 B2 | 12/2004 | Cheng |
| 6,889,330 B2 | 5/2005 | Chauvel et al. |
| 7,085,943 B2 * | 8/2006 | Chun et al. ................... 713/300 |
| 7,245,725 B1 | 7/2007 | Beard |
| 7,337,335 B2 * | 2/2008 | Jorgenson et al. ............ 713/300 |
| 7,472,301 B2 * | 12/2008 | Ginggen et al. .............. 713/324 |
| 7,542,091 B2 * | 6/2009 | Bean et al. .................... 348/372 |
| 7,925,906 B2 * | 4/2011 | Ranganathan et al. ....... 713/320 |
| 2003/0135768 A1 | 7/2003 | Knee et al. |
| 2003/0153353 A1 | 8/2003 | Cupps et al. |
| 2004/0030412 A1 | 2/2004 | Huang |
| 2005/0015589 A1 | 1/2005 | Silverman et al. |
| 2005/0052171 A1 * | 3/2005 | Horimoto ..................... 323/282 |

* cited by examiner

CIRCUITRY FOR OPTIMIZATION OF POWER CONSUMPTION IN A SYSTEM EMPLOYLING MULTIPLE ELECTRONIC COMPONENTS, ONE OF WHICH IS ALWAYS POWERED ON

CROSS-REFERENCE TO RELATED APPLICATIONS

This application is a continuation of prior application Ser. No. 11/140,053, filed May 27, 2005, which is herein incorporated by reference in its entirety.

BACKGROUND OF THE INVENTION

1. Field of the Invention

The present invention is directed to power consumption optimization circuitry for a system having multiple electronic components of which at least one is always powered on and at least one is normally powered off until otherwise powered on to perform a specific task or function. In particular, the invention is directed to a system including multiple processors of which at least one processor remains continuously powered on at all times, whereas at least one other processor is only powered on in response to a request to perform a specific task or function by that device.

2. Description of Related Art

When power consumption is not a design consideration or factor, a single processor may be used to perform different tasks of varying complexity. As a general rule, the more complex the task or function to be performed by the processor, the higher the clock speed needed. Therefore, when utilizing a single processor the clock frequency selected is the highest frequency necessary for performing the most complex task. This design configuration is advantageous in that it requires less components and thus a smaller footprint, but disadvantageously requires that the processor operate continuously at the highest clock speed for performing the most complex task. The most complex operation or task may only be performed occasionally. Therefore, to expend the power necessary to continuously operate the processor at the highest clock speed required is extremely inefficient from an energy consumption perspective.

To optimize power consumption, heretofore systems have been designed to employ multiple processors operating at different frequencies. U.S. Pat. No. 4,407,288 discloses an implantable heart stimulator controlled by a plurality of processors providing multiple modes of operation for performing various electrical heart stimulation techniques. Each processor is selected by virtue of its design for performing operations of a given type. In one embodiment, two processors are used, one selected for the performance of long term operations, simple in type that consume low power; the other processor is selected for the performance of more complex operations that are shorter in term and consumer more power.

To further reduce power consumption, one or more components may be placed in a sleep mode (low power mode) when not in use. U.S. Pat. No. 5,464,435 discloses a multifunction implantable medical device having a plurality of microprocessors used to perform functionality of varying complexity. Specifically, in one example the functions to be performed continuously are allocated to a dedicated master processor, while advanced functions that may be only periodically required, are allocated among one or more slave processors. With this master/slave arrangement of the parallel processors power consumption is reduced by causing the slave processors to enter a standby or "sleep" mode when not called upon to perform a task thereby consuming a reduced amount of energy than that while in active mode. The master processor upon encountering a task to be allocated or performed by a slave, activates and directs the slave processor to begin executing the desired code. Placing the slave processor in sleep mode, as described in the patented device, still consumes energy, albeit less than that required when the processor is fully powered up (in active mode). In the context of an implantable medical device in a closed system relying on the limited energy drawn from an internal power source, even a reduced amount of energy, expended by the implant while in sleep mode disadvantageously reduces the lifespan of the power source.

It is therefore desirable to optimize power consumption in a device employing multiple electronic components wherein at least one electronic component remains continuously powered on while one or more other electronic components are powered down or off until otherwise energized (powered on) when required to perform a specific task, function or operation. In contrast to the patented sleep mode operation, when in a powered off state the electronic components consume no energy whatsoever until activated to perform a specific task, function or operation.

SUMMARY OF THE INVENTION

One aspect of the present invention is to develop a system including multiple electronic components at least one of which remains continuously powered on while one or more other electronic components are only powered on in response to performing a specific operation, function or task.

Another object of the present invention is to design a device including multiple processors or controllers one of which remains continuously powered on while at least one other is normally powered off and energized only in response to performing a specific operation.

The present invention is directed to circuitry for conserving power in a system employing multiple electronic components of which a first electronic component operates at a first frequency and is continuously powered on by a power source. The system further includes a second electronic component operating at a second frequency different than that of the first frequency of the first electric component, the second electronic component being maintained in a powered off state in which no energy whatsoever is consumed by the second electronic component until energized in response to a power enabling signal generated by the first electronic component based on demand of the particular function to be performed by the second electronic component. The first and second electronic components may be processors, wherein the frequency of the first processor is lower than that of the second processor.

A particular application of the present invention circuitry for optimization of power consumption is employed in a closed system including an external control device in communication with and separated by a boundary from an internal device. The internal device has a first processor operating at a first frequency and continuously powered by an internal power source. A second processor operating at a second frequency higher than that of the first frequency of the first processor is maintained in a powered off state in which no energy is consumed until powered on in response to a power enabling signal generated by the first processor based on demand to perform a particular task by the second processor. Power supplied to the second processor is adjusted or regulated by a voltage regulator disposed between the internal power source and second processor. A switch electrically connects the internal power source to the regulator. The switch remains in an open state until closed in response to the power enable signal generated by the first processor. Furthermore, the internal device includes a voltage level translator electrically coupled as an interface between the first and second processors operating at different supply voltage levels to translate a logic signal from a first power supply voltage of the first processor to a second power supply voltage of the second processor.

Another aspect of the invention relates to a method for optimizing power consumption in a system as described in the preceding paragraphs. Initially a power enable signal is generated by the first electronic component. The second electronic component is energized in response to receiving the power enable signal generated by the first electronic component. While the second electronic component is in an energized state, a logic data signal converted by a voltage level translator electrically coupled as an interface between the first and second electronic components operating at different supply voltage levels from a first power supply voltage of the first electronic component to a second power supply voltage of the second electronic component prior to being transmitted to the second electronic component. On the other hand, while the second electronic component is maintained in a powered off state, the voltage level translator prohibits transmission of the data signal to the second electronic component.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

Figure 1:
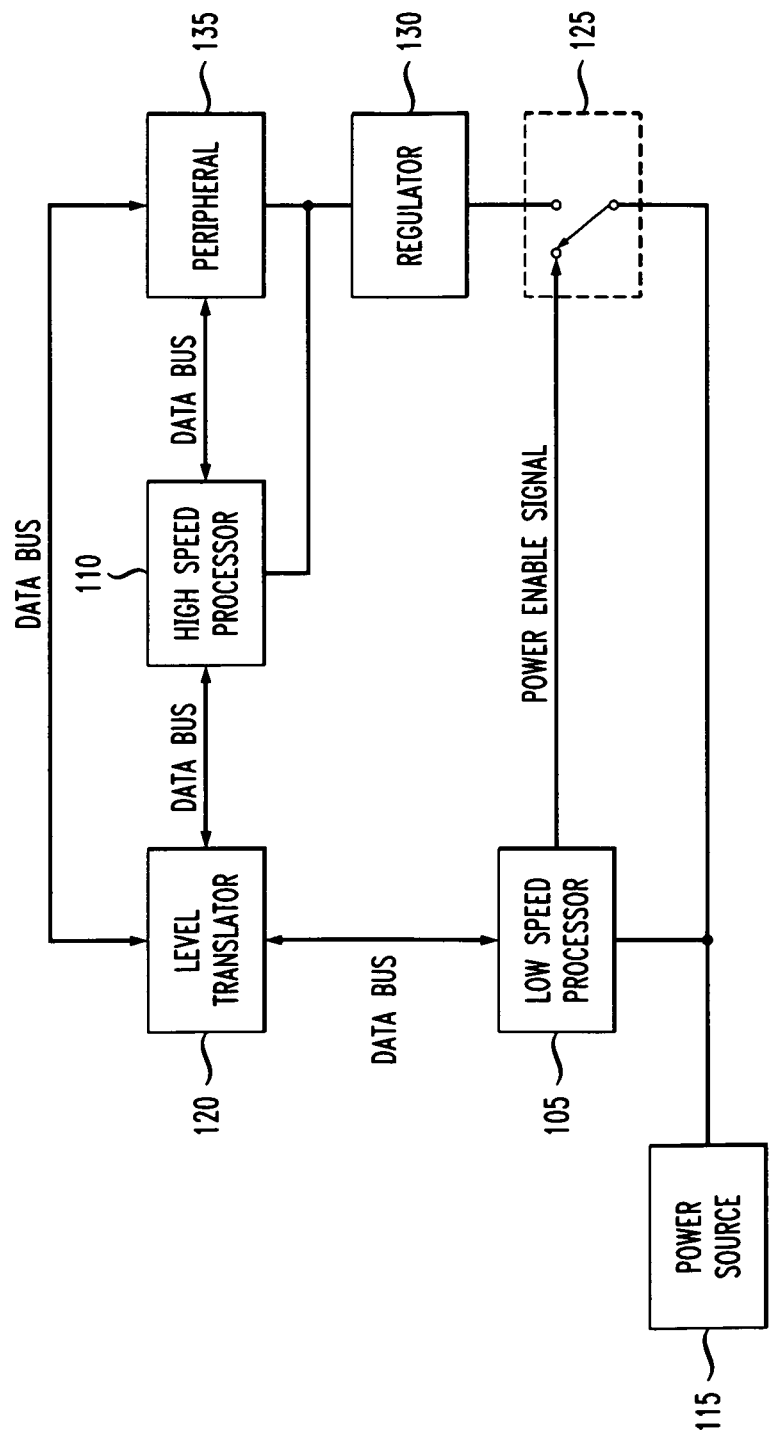
FIG. 1 is an exemplary schematic high level block diagram of a multi-processor system in accordance with the present invention including a first processor that is always powered on and a second processor that is normally powered off and energized only in response to a request to perform a specific operation.

FIG. 1 is an exemplary high level block diagram of a multi-processor system 100 including two processors, controllers or microcontrollers, i.e., a first processor 105 and a second processor 110. Processors 105, 110 preferably operate at different clock speeds or frequencies depending on the task or functionality performed by each. The first processor 105 preferably operates at as low a clock speed as possible, for example, approximately 32 KHz, and remains directly powered on at all times by power source or supply (e.g., battery) 115. Due to its low clock speed and continuously powered on status the first processor 105 may, for example, be used to provide a real time clock signal for the system that continuously counts down 24 hour periods. The second processor 110 performs more complex tasks or functions and operates at a clock frequency higher than that of the first processor 105. Since the tasks or functions performed by the second processor 110 are more complex than those of the first processor 105 the second processor requires a substantially higher clock frequency thereby consuming a greater amount of energy than that of the first processor 105. Processor 110 performs specific complex tasks or functionality that need not be operational at all times. Accordingly, the second processor 110 is normally maintained in a powered off state (expending zero energy) and is only powered on based on demand of a particular operation, task or function for which it is to perform.

In the exemplary configuration shown in FIG. 1, the output data signal from the second processor 110 is transmitted for further processing by peripheral circuitry denoted generically by block 135. Although represented as a single block, peripheral circuitry may be more than one component or device. Peripheral circuitry or block 135 may represent one or more circuits or components that perform operations or processing on the data prior to being input to and/or after being output from the second processor 110. By way of example, peripheral circuitry 135 may include signal conditioning circuitry. Regulated power provided to the second processor 110 is supplied by a regulator 130. In order to conserve energy regulator 130, second processor 110, and peripheral block 135 are normally maintained in a powered off or down state and powered on based on demand in response to a power enable signal from the first processor 105. The power enable signal may be triggered by the first processor 105 after acknowledging a particular operation, task or function to be performed by one or more of the powered down components (e.g., regulator 130, second processor 110 and peripheral block 135). Specifically, in response to a power enable signal generated by the first processor 105, a switch 125 is closed thereby supplying power from the power source or supply 115 to the regulator 130 which, in turn, energizes the second processor 110 and peripheral block 135.

Due to their different speeds processors 105, 110 most likely operate in different voltage domains. A voltage level translator 120 electrically connected as an interface permits communication between the first and second processors operating at different voltage supply levels by translating or converting a logic signal from a first power supply voltage to a second power supply voltage. In addition, level translator 120 toggles or switches the supply of power and data to the second processor 110 completely on/off corresponding to a powered on/off state, respectively. Specifically, level translator 120 is connected to both processor 105, 110 and determines the appropriate power level for each either directly from the power source 115 or the regulated output from the regulator 130. When the high speed processor (second processor) 110 is powered off, the level translator 120 is powered only on the low speed processor side. In such a case, the level translator 120 prohibits the toggle of a signal incoming to the low speed processor (first processor) 105 from toggling of a translated signal on the high speed processor side that otherwise may damage the high speed processor 110. In the case where power is provided to the high speed processor 110, both sides of the level translator 120, are energized or powered on thereby enabling translation or conversion of signals between the two voltage domains. Since both processors are energized, when an incoming signal from the low speed processor 105 toggles, a corresponding translated signal also toggles on the high speed processor side of the level translator 120, and vice versa.

In operation, the first processor 105 is continuously and directly powered by the power source 115 (e.g., a battery). The regulator 130, second processor 110 and peripheral device 135 are normally cut off from the power source 115 via open switch 125. When a task or function to be performed by the second processor 110 is elicited in response to a particular demand or request, the first processor 105 generates and transmits a power enable signal to close switch 125 thereby energizing regulator 130. In turn, regulator 130 produces a regulated voltage output that supplies power to the second processor 110 and peripheral device 135. Once power is received by the second processor 110, the level translator 120 permits data to pass between the two processors 105, 110. Accordingly, this general design configuration advantageously allows continuous operation of one processor while another intermittently operational processor is normally maintained in a powered off state consuming no energy whatsoever. The second processor 110 is powered on only as needed in response to an enabling signal generated by the first processor 105 based on demand for a particular operation, function or task to be performed by the second processor.

Figure 2:
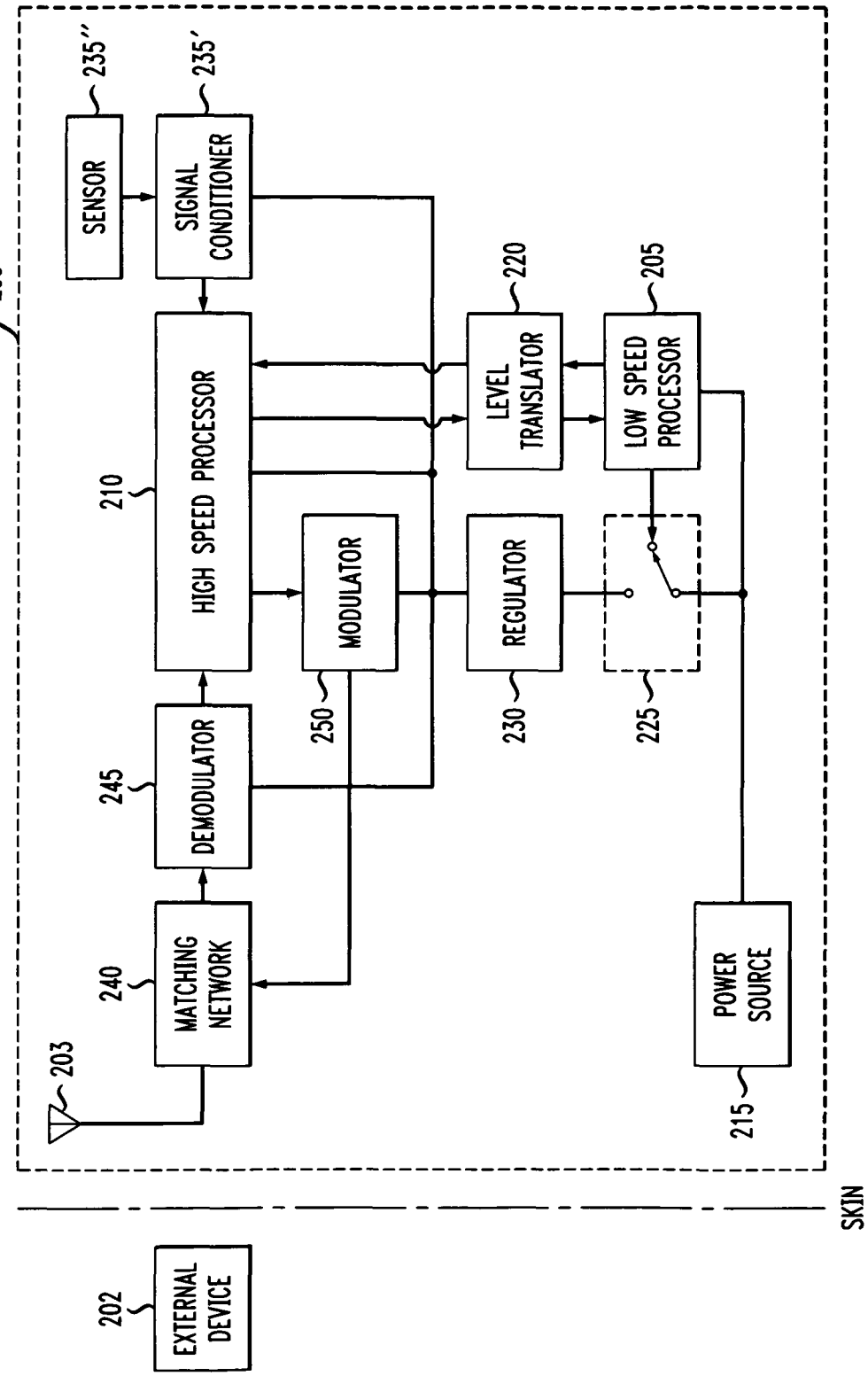
FIG. 2 is a block diagram of an exemplary implementation of the present invention for use in an implantable medical device.

FIG. 2 shows a specific exemplary application of the present inventive power consumption optimization circuitry for use in a closed system such as an medical implant application system. The closed system includes an internal device 200 (e.g., an implantable medical device such as a drug infusion pump, stimulator, or sensor) in telemetric communication across a boundary (e.g., skin) with an external device 202 such as a controller, processor or personal digital assistant (PDA). During communication an RF communication signal is sent from the external device to the implantable medical device. In a preferred embodiment, the RF communication signal includes a data stream or signal and an RF energy signal. The RF energy signal when received by the implantable medical device induces a voltage therein.

In the preferred embodiment shown in FIG. 2, the first processor 205 operates at a relatively low speed (e.g., 32 KHz) and is powered on continuously and directly by energy supplied by an internal power source (e.g., battery) 215. First processor 205 is preferably used to continuously operate a real time clock that continuously counts down a 24 hour time period. A voltage level translator 220 is electrically connected to interface between the first processor 205 and second processor 210 operating at different voltage domains as well as to toggle on/off data being transmitted to the second processor 210. Accordingly, in the toggled off state (when no power is supplied to the second processor 210), the level translator 220 will cut off or prohibit the supply of data to the second processor 210.

In operation, an incoming RF modulated signal from the external device 202 is received at an antenna or coil 203 of the implantable medical device 200 and output from a matching network 240. Demodulator 245 receives as input the RF modulated signal from the matching network 240 and outputs a demodulated data signal that is received by the second processor 210 and a signal conditioning circuit 235'. Information collected by sensor 235" is processed by a signal conditioning circuit 235' prior to being received as input to the high speed processor 210. In response to the RF communication signal from the external device 202, the implantable medical device 200 transmits a responsive communication signal generated by the processor 210 and modulated by block 250 prior to being passed through matching network 240. The modulated responsive communication signal is then transmitted via wireless radio communication from the implantable medical device 200 back to the external device 202.

Regulator 230, modulator 250, demodulator 245, high speed processor 210, sensor 235", and signal conditioning circuit 235' need not be operational at all times and thus remain powered down or off until receiving a power enable signal generated by the first or low speed processor 205. In the exemplary embodiment shown in FIG. 2, the power enable signal is generated by the first processor 205 in response to at least one of the following conditions: (i) the expiration of a predetermined period of time for initiating automatic self-testing sequencing or (ii) detecting the presence of an RF communication signal (i.e., during communication from the external device). In response to either of these two conditions, the first processor 205 generates a power enable signal to close switch 225 thereby energizing regulator 230 with power supplied from the power source 215. Regulator 230 receives an input voltage (e.g., approximately 2.8V supplied from the power source 215) and produces a regulated output voltage (e.g., approximately 1.8V) which, in turn, energizes or powers modulator 250, demodulator 245, high speed processor 210, sensor 235", and signal conditioning circuit 235'.

In the absence of RF communication from the external device 202 to the implantable medical device 200, regulator 230, demodulator 245, modulator 250, high speed processor 210, sensor 235" and signal conditioning circuit 235', are normally maintained in a powered off state. While the second processor is powered down or off thereby consuming no energy whatsoever, level translator 220 prohibits the passage of data from the first processor to the second processor. It is advantageous to automatically and periodically perform self-testing on one or more components of the implantable medical device to ensure their proper operation. Accordingly, at the expiration of a predetermined period of time as counted down by the real time clock, the first processor 205 initiates a power on enable signal that closes switch 225 thereby energizing the previously powered down components (i.e., regulator 230, demodulator 245, modulator 250, high speed processor 210, sensor 235" and signal conditioning circuit 235') in preparation for self-testing operations. After completion of the self-testing sequencing regulator 230, demodulator 245, modulator 250, high speed processor 210, sensor 235" and signal conditioning circuit 235' are once again powered down.

Aside from the periodic powering on of the previously powered down components to perform automatic self testing, another condition for enabling the power on signal is in the presence of RF energy. During communication, external device 202 transmits an RF communication signal that is received by antenna 203 and output from matching network 240. As previously noted, the RF communication signal preferably includes both a data stream signal and an RF energy signal. Prior to receipt of the RF communication signal by the implantable medical device 200 (i.e., in the absence of an RF energy signal) the regulator 230, demodulator 245, modulator 250, high speed processor 210, sensor 235" and signal conditioning circuit 235', are normally maintained powered down (except for powering on in response to the countdown of the predetermined period of time for automatic self-testing). During communication, the presence of the RF energy signal enables the power on signal that closes switch 225. Approximately 2.8V of power from the power source 215 is supplied as input to regulator 230 whose output regulated voltage of approximately 1.8V energizes regulator 230, demodulator 245, modulator 250, high speed processor 210, sensor 235" and signal conditioning circuit 235'.

With the components powered on the RF modulated signal output from the matching network 240 is demodulated by demodulator 245 prior to being received and processed by the high speed processor 210. In response to the received RF communication signal from the external device, the high speed processor 210 receives information output by sensor 235" and processed by the signal conditioning circuit 235' to produce a responsive communication signal. Block 250 modulates the responsive communication signal prior to being passed through the matching network and transmitted wirelessly to the external device 202.

The present invention has been illustrated and described with respect to a system employing multiple processors at least one of which is always powered on while one or more other processors remain powered down only to be energized in response to a request to perform a particular operation, task or function. It is contemplated and within the intended scope of the present invention to apply this same concept to powering on/off of any electronic components. Energy consumption is optimized by maintaining one or more electronic components that are intermittently operational and require a relatively high power level to remain in a normally powered off state until enabled to perform a particular task or function. The power enable signal may be triggered or generated, as desired, by a first electronic component that is continuously energized based on a particular application and design configuration in response to one or more conditions that when satisfied energize an otherwise normally powered down second electronic component.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. Circuitry for conserving power in a system having multiple electronic components, comprising:
    a power source;
    a first electronic component operating at a first frequency and continuously powered on by the power source;
    a second electronic component operating at a second frequency different than that of the first frequency of the first electric component, the second electronic component being maintained in a powered off state in which no energy is consumed by the second electronic component until energized in response to a power enabling signal generated by the first electronic component based on demand of the particular function to be performed by the second electronic component; and
    a voltage level translator electrically coupled as an interface between the first and second electronic components operating at different voltage supply levels; when the second electronic component is energized, the voltage level translator converting a logic data signal received as input to the first electronic component from a first power supply voltage to a second power supply voltage prior to transmission to the second electronic component; and the voltage level translator prohibiting transmission of the data signal when the second electronic component is in a powered off state.

2. A closed system including:
    an external control device;
    an internal device separated from the external device by a boundary and receiving communications from the external control device, the internal device comprising:
    an internal power source;
    a first processor operating at a first frequency and continuously powered by the internal power source;
    a second processor operating at a second frequency higher than that of the first frequency of the first processor, the second processor being maintained in a powered off state in which no energy is consumed until powered on in response to a power enabling signal generated by the first processor based on demand to perform a particular task by the second processor;
    a regulator electrically connected to adjust power supplied to the second processor;
    a switch electrically connected between the internal power source and the regulator, the switch remaining in an open state until closed in response to the power enable signal generated by the first processor; and
    a voltage level translator electrically coupled as an interface between the first and second processors operating at different supply voltage levels to translate a logic signal from a first power supply voltage of the first processor to a second power supply voltage of the second processor.

3. The closed system in accordance with claim 2, wherein the regulator and second processor are maintained in a powered off state until powered on in response to the power enabling signal generated by the first processor based on demand of the particular function to be performed by the second processor.

4. The closed system in accordance with claim 2, wherein the internal device further comprises a demodulator electrically coupled to the second processor, the demodulator being maintained in a powered off state until powered on in response to the power enabling signal generated by the first processor based on demand of the particular function to be performed by the second processor.

5. The closed system in accordance with claim 2, wherein the first frequency is lower than that of the second frequency.

6. The closed system in accordance with claim 5, wherein the first processor is a real time clock for continuously counting down a 24 hour time period.

7. A method for optimizing power consumption in a system including a first electronic component operating at a first frequency and being continuously powered on by a power source, and a second electronic component electrically coupled to the first electronic component by a voltage level translator and operating at a second frequency different than that of the first frequency of the first electric component, the second electronic component being normally maintained in a powered off state in which no energy is consumed by the second electronic component, comprising the steps of:
    generating a power enable signal by the first electronic component;
    energizing the second electronic component in response to receiving the power enable signal generated by the first electronic component; and
    when the second electronic component is in an energized state, transmitting a logic data signal converted from a first power supply voltage of the first electronic component to a second power supply voltage of the second electronic component using a voltage level translator electrically coupled as an interface between the first and second electronic components operating at different supply voltage levels; while prohibiting transmission of the data signal to the second electronic component while in a powered off state.

8. The method in accordance with claim 7, wherein the first and second electronic components are first and second processors.

9. The method in accordance with claim 8, wherein the first frequency is lower than the second frequency.

10. The method in accordance with claim 8, wherein the first processor is a real time clock continuously counting down a 24 hour time period.

11. The method in accordance with claim 7, wherein the energizing step comprises:
   closing a switch electrically coupled between the power source and a voltage regulator, the switch being normally maintained in an open state and powering on the voltage regulator and second electronic component in response to receiving the power enable signal from the first electronic component.

* * * * *

UNITED STATES PATENT AND TRADEMARK OFFICE
CERTIFICATE OF CORRECTION

| | | |
|---|---|---|
| PATENT NO. | : 9,201,484 B2 | Page 1 of 1 |
| APPLICATION NO. | : 12/313445 | |
| DATED | : December 1, 2015 | |
| INVENTOR(S) | : Giggen et al. | |

It is certified that error appears in the above-identified patent and that said Letters Patent is hereby corrected as shown below:

Title Page

In the title item (54):

Change "Employling" to --Employing--.

Signed and Sealed this
Fifteenth Day of March, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,201,484 B2 | Page 1 of 1 |
| APPLICATION NO. | : 12/313445 | |
| DATED | : December 1, 2015 | |
| INVENTOR(S) | : Giggen et al. | |

It is certified that error appears in the above-identified patent and that said Letters Patent is hereby corrected as shown below:

Title Page, in the title item (54) and in the Specification, Col. 1 Line 3:

Change "Employling" to --Employing--.

This certificate supersedes the Certificate of Correction issued March 15, 2016.

Signed and Sealed this
Twenty-eighth Day of June, 2016

Michelle K. Lee
*Director of the United States Patent and Trademark Office*